Nov. 2, 1954 — R. L. RENFROE — 2,693,386
BEAM CLAMP
Filed April 20, 1954
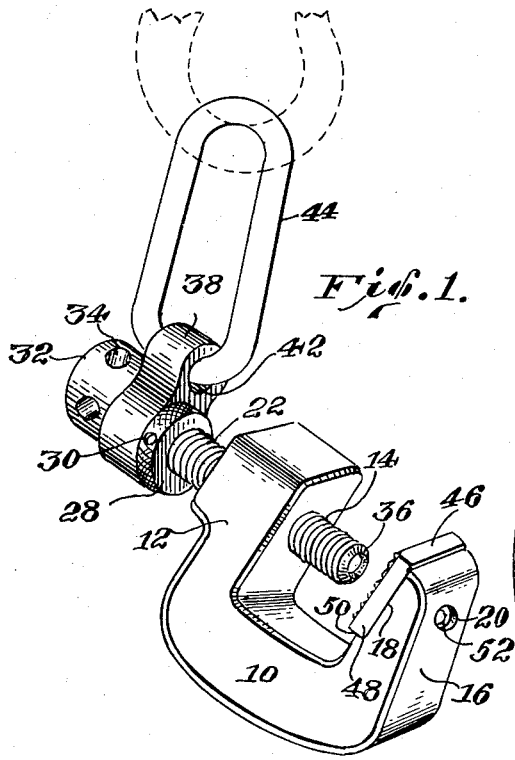
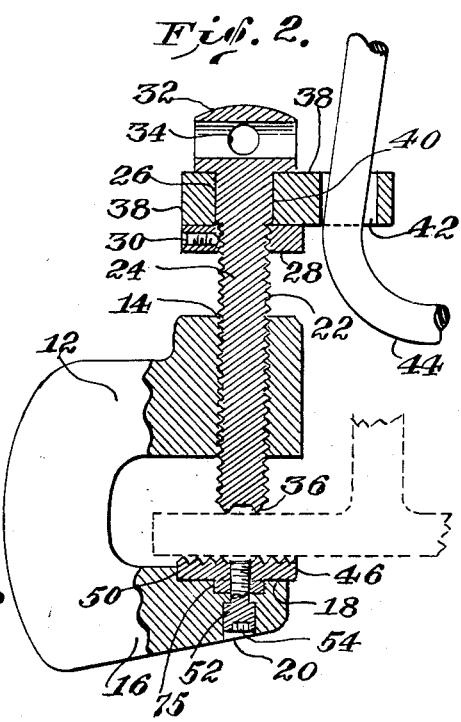
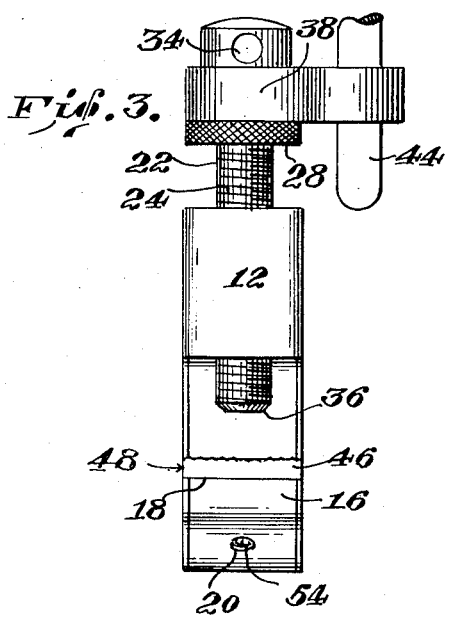
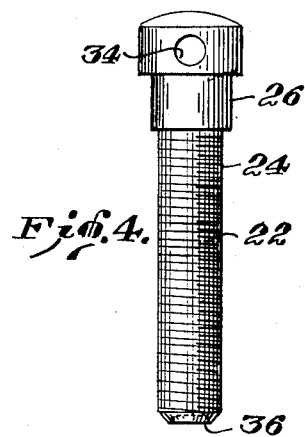
INVENTOR
RAYMOND L. RENFROE
BY *Mason, Mason & Sheridan*
ATTORNEYS 和
United States Patent Office 2,693,386
Patented Nov. 2, 1954

2,693,386

BEAM CLAMP

Raymond L. Renfroe, Jacksonville, Fla., assignor to J. C. Renfroe & Sons, Inc., a corporation of Florida Application April 20, 1954, Serial No. 424,327

7 Claims. (Cl. 294—92)

This invention relates to a new and improved form of load lifting means, such as a beam and plate lifting clamp, and more particularly to a clamp having a universal torque action; i. e., lifting torque may be applied to the work at about a 360° angle of approach.

An object of the invention is to provide an improved form of beam and plate lifting clamp providing a minimum number of parts, and further provided with an adjustable gripping edge that may be readily adjusted for any thickness of the workpiece or load.

Another object is to provide a clamp of this type having means providing a universal torque action including means for adjusting the gripping angle of the jaws.

A further object is to provide a clamp having relatively fixed and movable jaws, and supporting and suspending means for the movable jaw.

Yet another object is to provide a clamp having a movable jaw comprising an adjustable screw with swivel means attached adjacent one end of the screw and beam supporting means attached to the swivel means.

Other objects will appear hereinafter throughout the specification.

In the drawings, which form part of the invention:

Figure 1 is a perspective view of the preferred form of the invention in unloaded position;

Figure 2 is a side elevation, partly in vertical section, of the structure shown in Figure 1;

Figure 3 is an end elevation of the structure of Figures 1 and 2; and

Figure 4 is an enlarged detail view of the screw.

The device of this invention is particularly adapted for lifting large steel or other metal I beams, H beams, plates or other material, and it comprises a clamp with a fixed and a movable jaw and supporting means therefor, having novel physical characteristics which will be pointed out hereinafter as follows:

As shown in Figure 1, the clamp comprises a body 10 that is of heavy metallic construction, such as steel, and which is generally U-shaped in vertical section.

The upper extension 12 of the clamp is provided with a screw-threaded aperture 14 and the lower extension 16 has a recessed or stepped portion 18, and an aperture 20.

Threadedly engaging the threads 14 of the upper extension 12 is a screw 22 having threads 24 extending along the major portion of the axial length thereof, and provided with a plain cylindrical bearing portion 26 adjacent the upper end thereof. Mounted on threads 24 is a screw-threaded nut 28 having a lock-screw 30 for locking the nut in adjustable position on screw 22. The upper end of screw 22 is provided with a head 32 having a series of spaced apertures 34 for the insertion of a pin, not shown, whereby the movable jaw 36 of the screw clamp may be tightened against a steel plate or other workpiece. As shown, the movable jaw 36 preferably comprises a circular gripping surface.

Surrounding the cylindrical portion 26 of screw 22 is the circular aperture 40 of a swivel 38. The swivel is adapted to rotate on the cylindrical bearing portion 26 and to be held against the undersurface of head 32 by nut 28, these parts providing thrust bearing surfaces for the swivel. The opposite end of the swivel is provided with a similar aperture 42 for the reception of a link 44. The link is supported by a hoisting hook.

The fixed jaw comprises a shoe 46 having teeth on its upper surface and preferably having a plurality of sides 48, one of which is adapted to be in juxtaposed relationship with the wall 50 of the recess 18.

The aperture 20 is adapted to receive the pin 52 that screw-threadedly engages the central portion of the shoe 46, and the shoe is locked in position in said recess by the use of a suitable wrench, not shown, that engages squared socket 54. By loosening the pin 52, shoe 46 can be raised from the recess and partially rotated, then again dropped in the recess and tightened, to present a new set of teeth to the flanges of the beam or to the metal plate to be lifted.

It will be appreciated that the swivel jaw and screw 22, upon which it swivels, provides a means for readily moving the clamp body toward the flange of the I beam, H beam or to a plate to be lifted, from any angle. Moreover, the screw adjustment of the movable jaw allows an adjustment of the lifting torque to be applied against the load, in order to lift the work at different adjusted angles with regard to a vertical plane passing through the clamp.

The lower end of the screw has a peripheral or circular gripping edge 36 in order to increase the bight of the movable jaw.

In addition to the advantages noted above, the novel construction provides the following ones:

The lower end of the screw may be adjusted to accommodate any thickness of beam or steel sheet to be lifted. The beam or sheet is elevated from the end of the adjusting screw, and lifting of the same does not necessarily depend upon the adjustment of the screw. However, the adjustment of the screw provides for different gripping or load torque characteristics, and the beam or sheet may be gripped so as to apply its pull on the same at about a 360° angle of approach. The swivel shackle on the end of the screw applies the point of lift directly to the point of contact of the movable jaw. The beam or sheet applies a torque action to the jaws, thereby making each jaw exert a greater gripping action under conditions of greater load.

In prior devices, the use of a greater load causes a lessening of the clamping action of the lifting clamp.

Moreover, in use of the present invention, when the movable jaw is screwed up to tightly grip the load, it will grip the beam or sheet firmly and without any chance of slippage, whether or not the load is of any consequential weight.

The I beam, H beam or sheet is held in a position which is between a horizontal and a vertical plane, and it is this position which sets up the clamping or torque action against the relatively movable and stationary jaws.

Jaw 46 has a round projection 75 fitting a round aperture in the base to prevent the jaw from slipping when lifting a load.

The above description and drawings discloses a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A load lifting clamp comprising a clamp body having upper and lower extensions, a fixed jaw in the lower extension and a movable jaw in the upper extension, thread means for mounting said movable jaw in said upper extension whereby said movable jaw may be adjusted toward and away from said fixed jaw, said movable jaw having swivel means located above said upper extension, and means on said swivel means for engagement by a hoisting hook or other hoisting means.

2. A load lifting clamp comprising a clamp body having upper and lower extensions, a fixed jaw in the lower extension and a movable jaw in the upper extension, thread means for mounting said movable jaw in said upper extension whereby said movable jaw may be adjusted toward and away from said fixed jaw, said movable jaw having swivel means located above said upper extension, means on said swivel means for engagement by a hoisting hook or other hoisting means, said lower jaw comprising a shoe, a recess in said lower extension, said recess having a straight wall, and said shoe having a straight wall located in juxtaposed position of the straight wall first named.

3. A load lifting clamp comprising a clamp body having upper and lower extensions, a fixed jaw in the lower extension and a movable jaw in the upper extension, thread means for mounting said movable jaw in said upper extension whereby said movable jaw may be adjusted toward and away from said fixed jaw, said movable jaw having swivel means located above said upper extension, means on said swivel means for engagement by a hoisting hook, and means for adjusting said movable jaw.

4. A load lifting clamp comprising a clamp body having upper and lower extensions, a fixed jaw in the lower extension and a movable jaw in the upper extension, thread means for mounting said movable jaw in said upper extension whereby said movable jaw may be adjusted toward and away from said fixed jaw, said movable jaw having swivel means located above said upper extension, means on said swivel means for engagement by a hoisting hook, said lower jaw comprising a shoe, a recess in said lower extension, said recess having a straight wall, and said shoe having a straight wall located in juxtaposed position to the straight wall first named, and means for adjusting said movable jaw.

5. A load lifting clamp comprising a clamp body having upper and lower extensions and a movable jaw in the upper extension, a fixed jaw in the lower extension, thread means for mounting said movable jaw in said upper extension whereby said movable jaw may be adjusted toward and away from said fixed jaw, said movable jaw having swivel means located above said upper extension, means on said swivel means for engagement by a hoisting hook, and means for adjusting said movable jaw, said last-named means comprising a head on said movable jaw and at least one aperture extending through said head, said fixed jaw comprising a shoe, a recess in said lower extension, said recess having a straight wall and said shoe having a straight wall located in juxtaposed position to the straight wall first named, said shoe having a circular projection and said lower extension having a circular recess into which said circular extension fits when said shoe is in position on said lower extension, and a cap screw threadedly connecting said extension and shoe to each other.

6. A load lifting clamp comprising a clamp body having upper and lower extensions, a fixed jaw in the lower extension and a movable jaw in the upper extension, thread means for mounting said movable jaw in said upper extension whereby said movable jaw may be adjusted toward and away from said fixed jaw, said movable jaw having swivel means located above said upper extension, means on said swivel means for engagement by a hoisting hook, said lower jaw comprising a shoe, a recess in said lower extension, said recess having a straight wall, and said shoe having a straight wall located in juxtaposed position to the straight wall first named, and means for adjusting said movable jaw, said last-named means comprising a head on said movable jaw and at least one aperture extending through said head.

7. A load lifting clamp comprising a clamp body having an upper extension and a lower extension, a fixed jaw on said lower extension and a movable jaw on said upper extension, said upper extension having a screw-threaded aperture, a screw having threads engaging the threads of said aperture and having a work engaging surface on one end thereof, said screw having a cylindrical surface adjacent the end remote from said work engaging surface, a swivel mounted on said cylindrical surface, said screw having a head on one side of said cylindrical surface, and a nut adjustable toward and from said cylindrical surface on the opposite side of said cylindrical surface from said head, and a hoisting means connected with said swivel means.

References Cited in the file of this patent

UNITED STATES PATENTS

| Number | Name | Date |
|---|---|---|
| 2,548,401 | Sherwood | Apr. 10, 1951 |
| 2,636,770 | Cornwell | Apr. 28, 1953 |
| 2,674,485 | Jamison | Apr. 6, 1954 |